United States Patent [19]

Mallet

[11] Patent Number: 4,460,290
[45] Date of Patent: Jul. 17, 1984

[54] ASSEMBLY COMPRISING A COUPLING ELEMENT HAVING A REINFORCED HUB

[75] Inventor: Bernard Mallet, Limay, France
[73] Assignee: Nadella, Rueil Malmaison, France
[21] Appl. No.: 543,214
[22] Filed: Oct. 18, 1983

Related U.S. Application Data

[63] Continuation of Ser. No. 248,225, Mar. 27, 1981.

[30] Foreign Application Priority Data

Mar. 28, 1980 [FR] France ............................ 80 07026

[51] Int. Cl.³ ............................................... F16B 2/02
[52] U.S. Cl. .................................. 403/373; 403/337; 403/312; 464/134
[58] Field of Search ................... 403/57, 58, 373, 383, 403/408, 312, 337; 29/150; 220/320, 325; 464/134

[56] References Cited

U.S. PATENT DOCUMENTS

| | | | |
|---|---|---|---|
| 2,243,724 | 5/1941 | Whitehead et al. | 29/150 UX |
| 2,736,083 | 2/1956 | Rogers | 220/325 X |
| 3,612,582 | 10/1971 | Pitner | 464/134 X |
| 3,688,550 | 9/1972 | Stanley | 29/150 X |
| 3,867,050 | 2/1975 | Pitner | 403/373 |
| 3,889,908 | 6/1975 | Larson | 403/57 X |

Primary Examiner—Andrew V. Kundrat
Attorney, Agent, or Firm—Robert E. Burns; Emmanuel J. Lobato; Bruce L. Adams

[57] ABSTRACT

The assembly comprises a shaft or any other torque transmitting means, and a coupling element which is of sheet metal and has a hub including a portion provided with an axially extending slot whose width is sufficient to allow an assembly by a relative radial displacement of the shaft and hub. The sides of the hub portion defining the slot are extended at least locally and substantially perpendicularly to the axial plane of symmetry by ears which extend outwardly. The ears cooperate with an attached member which is disposed transversely of the slot so as to interconnect the hub and shaft owing to the action of clamping means. Each of the ears is folded horizontally onto itself so as to form a double thickness of the ear.

12 Claims, 3 Drawing Figures

ASSEMBLY COMPRISING A COUPLING ELEMENT HAVING A REINFORCED HUB

This is a continuation of application Ser. No. 248,225 filed Mar. 27, 1981.

DESCRIPTION

The present invention relates to an assembly with a shaft or any other torque-transmitting member of a coupling element of sheet metal comprising a hub which has a portion provided with an axially extending slot whose width is sufficient to permit an assembly by a relative radial displacement of the shaft and hub.

Such assemblies are known in which the sides of the hub defining the slot are extended, at least locally, by substantially horizontal ears which extend outwardly and cooperate with the ends of an attached member which is disposed transversely of said slot so as to ensure the compression of the hub in contact with the shaft by the action of clamping means.

A good interconnection is achieved between the shaft and the hub by the cooperation, after clamping, of their complementary shapes and the suitable shape of the attached member.

However, the clamping operation is liable, when it is not accompanied by necessary precautions, to deform the geometry of the hub and give a result which is the opposite of the desired result.

An object of the present invention is to overcome the aforementioned drawback and to provide an assembly in which the hub is provided with means which enable it to retain its geometry when clamping said assembly, wherein each of said ears is folded onto itself horizontally and results in a double thickness.

In a first embodiment of the invention, the edge of the fold disposed adjacent the hub is so shaped as to extend the inner surface of the hub in accordance with a contour which is complementary to the contour of the shaft.

Further features and advantages of the invention will be more clearly apparent from the ensuing description of two embodiments which are given solely by way of examples and shown in the accompanying drawings, in which.

Figure 1:
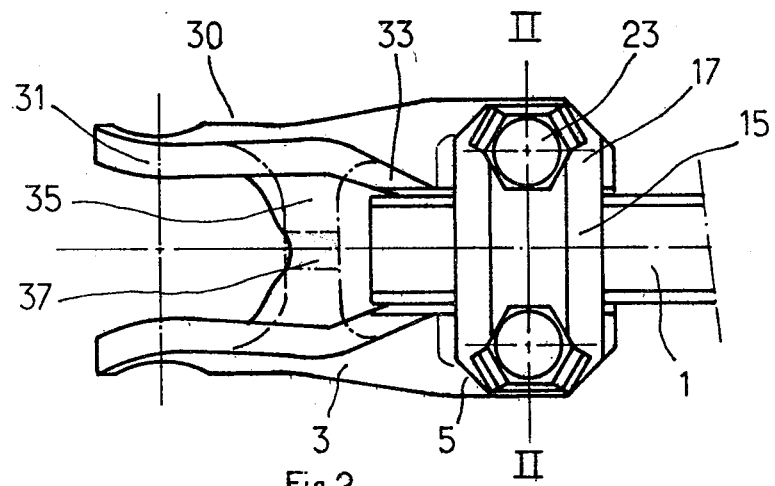
FIG. 1 is an axial sectional view of an assembly according to the invention applied to the hub of the yoke of a universal joint.
Figure 2:
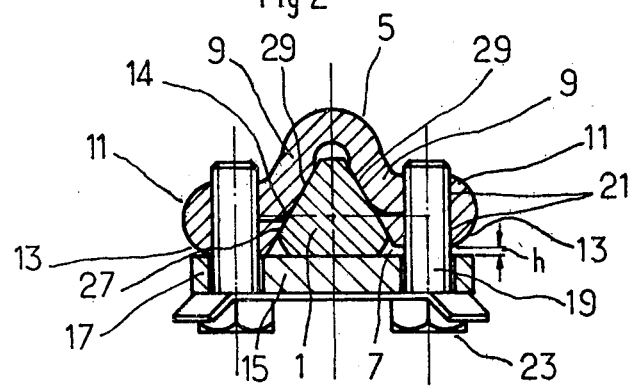
FIG. 2 is a radial sectional view taken on line 2—2 of the device of FIG. 1.

FIGS. 1 and 2 represent an assembly according to the invention of a torque-transmitting element such as a shaft 1 and a coupling element 3 of sheet metal, obtained by cutting, rolling and/or folding either a section of a tube or preferably a planar sheet, so as to form a hub 5 having a portion provided with an axially extending slot 7 which has a generally U- or V-sectioned shape and has a width which is sufficient to permit an assembly by a relative radial displacement of the shaft which has a complementary profile, and said hub whose vertical and oblique sides 9 which define the slot are each extended, at least locally, and substantially perpendicularly to the axial plane of symmetry, by an ear 11 substantially contained in a horizontal plane. There is preferably slight vertical offset to an extent "h" between the horizontal planes of the two ears. The ears extend outwardly of the slot 7 and each is folded inwardly onto itself so as to result in a double thickness owing to a substantially horizontal fold 13 which extends along its lower surface 14.

The interconnection of the shaft and hub, which have complementary rectangular or triangular cross-sectional shapes, for example, is ensured, in the known manner, by a substantially planar attached member 15 (with or without interposition of a key, not shown) disposed transversely of the slot and bearing by at least one end 17 on a fold 13, the clamping of this member against the shaft and the hub being achieved by means of screws 19 which extend through end portions of the member 15 with clearance and are screw threaded engaged in aligned apertures 21 in the double fold of the ears, the heads of the screws, bearing against the outer surface of said member.

The initially outer end edge of each ear, or the inner end edge 27 of the fold 13, is so shaped as to extend the inner surface 29 of the hub in accordance with a contour which is complementary to that of the shaft so as to bear against the shaft, which shaft consequently benefits from a more extended circumferential support after clamping. Thus, in the illustrated embodiment of a hub having a V-sectioned shape, the initially outer end edge 27 of each ear is cut on a bevel before folding so as to extend the oblique branch of the V outwardly without discontinuity.

It will be clear that the arrangement according to the invention increases the rigidity of the hub and results in an improved clamping and consequently an improved coupling with no risk of deformation of the hub.

Figure 3:
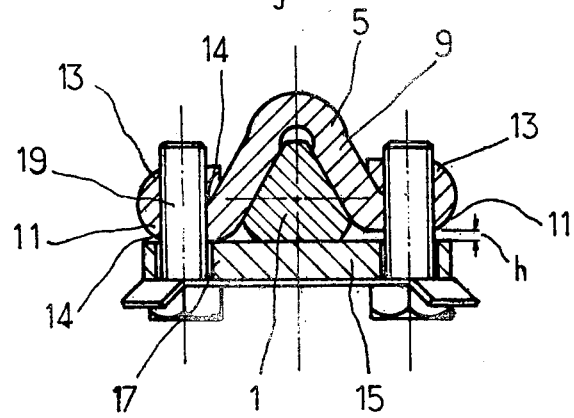
FIG. 3 is a radial sectional view of a second embodiment of the invention.

In the modification shown in FIG. 3, it is also possible to contemplate the obtainment of a double thickness by means of a fold 13' of each ear 11 which extends along the upper surface 14' of the latter opposed to the surface 14 on which is disposed the end 17 of the member 15, the screws 19 extending through these ends 17 and the ears 11 of double thickness, with the initially outer edges of the ears, or the inner end edges of the folds 13', being substantially coextensive with and abutting against the outer surface of the oblique sides 9 of the hub, as shown in FIG. 3.

In the embodiment shown in FIG. 1, the end 30 of the coupling element opposed to that which receives the shaft is so cut out as to define two branches 31, for example of cylindrical shape, of a yoke of a universal joint, in which case the ear and the fold mentioned hereinbefore start preferably in the region of the base 33 of each of the branches so that they increase the rigidity thereof and horizontally grow as they extend axially toward the end shown in section in FIG. 2.

In order to increase the rigidity of the assembly as concerns torsion, the yoke may be provided, in the region of the base 33 of each of the branches, with a tab 35 which extends this time radially inwardly and whose free ends are united by, for example, a weld 37 so as to form a bridge in the region of which the hub has a closed cross-sectional shape.

In another embodiment (not shown), the end 30 of the coupling element is so shaped as to have at least one fixing tab and preferably two fixing tabs located for example in a plane substantially perpendicular to the axis of the hub.

I claim:

1. An assembly comprising a torque-transmitting element and a coupling element which is of sheet metal and comprises a hub of generally U or V-shape symmetrical cross section with two side walls and a connecting portion defining an axially extending slot having an entrance of a width sufficient to permit assembly with said torque-transmitting element by relative radial displacement of the torque transmitting element and the hub, said two side walls having inner surfaces engaging complemental surfaces of said torque-transmitting element, ears extending outwardly from said side walls substantially perpendicularly to an axial plane of symmetry of the hub, each of said ears comprising a first portion formed of an outwardly bent portion of the respective side wall and a second portion bent back inwardly tight against said first portion in full facial contact therewith to form a double thickness ear, said second portion having an inner edge which constitutes a continuation of the inner surface of the respective side wall and engages said torque-transmitting element, a cooperating member overlying and extending across between said ears and engaging a complemental surface of said torque-transmitting element to secure it in said slot, and connecting means in aligned holes in said ears and overlying side portions of said cooperating member for connecting said cooperating member to said ears and thereby clamping said torque-transmitting element tightly in said slot.

2. An assembly according to claim 1, wherein said securing means comprises threaded screws extending through holes in said cooperating member and screwed into tapped holes in said ears.

3. An assembly according to claim 1, wherein said ears are offset relative to one another with respect to a plane perpendicular to said axial plane of symmetry of the hub, whereby said cooperating member in clamped condition engages one of said ears and is slightly spaced from the other.

4. An assembly according to claim 1, wherein the coupling element has at least one branch extending integrally from an end of said hub for fixing the hub to another element.

5. An assembly according to claim 1, wherein the coupling element has two branches extending in the same generally axial direction from said side walls of the hub and defining two branches of a yoke of a universal joint, said double thickness ears extending from said side walls in the vicinity of the base of the respective branches.

6. An assembly according to claim 5, wherein said branches are integrally connected with one another by a bridge portion extending between said branches.

7. An assembly comprising a torque-transmitting element and a coupling element which is of sheet metal and comprises a hub of generally U or V-shape symmetrical cross section with two side walls and a connecting portion defining an axially extending slot having an entrance of a width sufficient to permit assembly with said torque-transmitting element by relative radial displacement of the torque-transmitting element and the hub, said two side walls having inner surfaces engaging complemental surfaces of said torque-transmitting element, ears extending outwardly from said side walls substantially perpendicular to an axial plane of symmetry of the hub, each of said ears comprising a first portion formed of an outwardly bent portion of the respective side wall and a second portion bent back inwardly tight against said first portion in full facial contact therewith to form a double thickness ear, said second portion having an inner edge abutting and shaped to conform to the outer surface of the respective said wall and thereby reinforcing said side wall, a cooperating member overlying and extending across between said ears and engaging a complemental surface of said torque-transmitting element to secure it in said slot, and connecting means in aligned holes in said ears and overlying side portions of said cooperating member for connecting said cooperating member to said ears and clamping said torque-transmitting element tightly in said slot.

8. An assembly according to claim 7, wherein said securing means comprises threaded screws extending through holes in said cooperating member and screwed into tapped holes in said ears.

9. An assembly according to claim 7, wherein said ears are offset relative to one another with respect to a plane perpendicular to said axial plane of symmetry of the hub, whereby said cooperating member in clamped condition engages one of said ears and is slightly spaced from the other.

10. An assembly according to claim 7, wherein the coupling element has at least one branch extending integrally from an end of said hub for fixing the hub to another element.

11. An assembly according to claim 7, wherein the coupling element has two branches extending in the same generally axial direction from said side walls of the hub and defining two branches of a yoke of a universal joint, said double thickness ears extending from said side walls in the vicinity of the base of the respective branches.

12. An assembly according to claim 11, wherein said branches are integrally connected with one another by a bridge portion extending between said branches.

* * * * *